ated August 16, 1966

3,267,140
PROPYNYL DERIVATIVES OF SUBSTITUTED AMINO BENZENE SULFONAMIDES

George B. Sterling, Mogadore, Ohio, and Chester E. Pawloski, Bay City, Mich., assignors to The Dow Chemical Company, Midland, Mich., a corporation of Delaware
No Drawing. Filed Dec. 26, 1963, Ser. No. 333,660
4 Claims. (Cl. 260—556)

This invention is directed to compounds corresponding to the formula

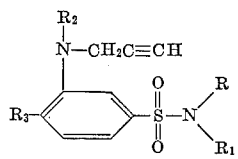

In this and subsequent formulae, R represents lower alkyl, $R_1$ represents lower alkyl or 2-propynyl, $R_2$ represents hydrogen or 2-propynyl, and $R_3$ represents hydrogen, methyl or methoxy. In the present specification and claims, "lower alkyl" designates an alkyl group of from 1 to 4 carbon atoms, inclusive. The compounds of this invention are liquid or solid materials which are somewhat soluble in many organic solvents and of low solubility in water. These compounds have been found to be useful as the toxic constituent in pesticidal compositions to be employed in controlling various insect, arachnid, fish, bacterial, helminth and fungal organisms such as ticks, mites, tapeworms, carp, soil bacteria, and plum curculio.

The compounds of the present invention are prepared by reacting a propargyl halide with a substituted benzene sulfonamide corresponding to the formula

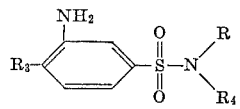

wherein $R_4$ represents hydrogen or lower alkyl. The reaction is carried out in the presence of a basic material and preferably in the presence of an organic liquid such as acetone, isopropanol or methyl ethyl ketone to be employed as reaction medium. The reaction runs smoothly at temperatures at which halide of reaction is produced and preferably at temperatures between 0 and 100° C. The halide of reaction appears as the halide salt of the metal cation from the employed basic material. Good results are obtained when employing one molecular proportion of substituted benzene sulfonamide starting material with propargyl halide and basic material each in molecular proportions of from 1 to the number of amino hydrogen atoms present in sulfonamide starting material. Thus, 1, 2 or 3 moles of each of the propargyl halide and the basic material are employed with each mole of sulfonamide starting material depending upon whether it is desired to introduce 1, 2 or 3 paragaryl moieties into the molecule. For optimum yields, the use of reactants in such amounts is preferred. Upon completion of the reaction, the product can be separated and purified by conventional procedures.

In carrying out the reaction the substituted benzene sulfonamide, the basic material such as an alkali metal carbonate and a propargyl halide such as the chloride or bromide can be combined in any convenient fashion. In a preferred method, however, the reactants are dispersed in an organic liquid reaction medium. The mixture is maintained at the reaction temperature for a period of time to insure completion of the reaction. A substantial cessation in the production of the halide of reaction indicates that the reaction is substantially completed. At the end of the reaction period the warm reaction mixture is filtered to remove the halide of reaction. The filtrate is then heated to remove the low boiling constituents and obtain the product as a liquid residue.

The following examples are merely illustrations and are not to be construed as limiting.

*Example 1.*—N-*butyl*-N-*(2-propynyl) 3-[di-(2-propynyl)-amino]-p-methoxybenzenesulfonamide*

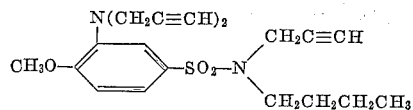

N-(n-butyl)-3-amino-4-methoxybenzenesulfonamide (30 grams), propargyl bromide (50 grams) and potassium carbonate (52 grams) were dispersed in 200 milliliters of acetone. The resulting mixture was heated with stirring at the boiling temperature and under reflux for thirty-two hours. The reaction mixture was then filtered while hot and the filtrate heated to remove the low boiling constituents and obtain the N-butyl-N-(2-propynyl) 3-[di-(2-propynyl)amino]-p-methoxybenzenesulfonamide product as a liquid residue. The product had a refractive index n/D of 1.4844 at 25° C.

*Example 2.*—N,N-*dimethyl 3-(2-propynylamino)-p-toluenesulfonamide*

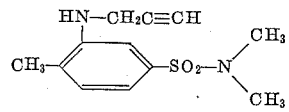

N,N-(dimethyl) 3-amino-4-methylbenzenesulfonamide (30 grams), propargyl halide (53 grams), and potassium carbonate (60 grams) were dispersed in 200 milliliters of acetone. The resultant solution was processed exactly as described in Example 1, to obtain the N,N-dimethyl 3-(2-propynylamino)-p-toluenesulfonamide product as a liquid having a refractive index n/D of 1.4915 at 25° C.

*Example 3.*—N,N-*diethyl 3-[di-(2-propynyl)amino]-p-methoxybenzenesulfonamide*

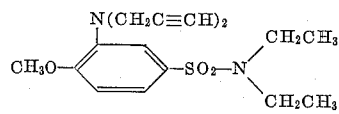

N,N-(diethyl) 3-amino-4-methoxybenzenesulfonamide (20 grams), propargyl bromide (30 grams) and potassium carbonate (35 grams) were dispersed in 200 milliliters of acetone. The resulting mixture was processed exactly as described in Example 1 to obtain the N,N-diethyl 3-[di-(2-propynyl)amino]-p-methoxybenzenesulfonamide product. This liquid product had a refractive index n/D of 1.4831 at 25° C.

The novel compounds of the present invention are useful as pesticides for the control of various tick, mite, worm, fish, insect, bacterial and fungal organisms. For such uses the product can be dispersed on a finely divided solid and employed as dusts. Also, such mixtures can be dispersed in water, with or without the aid of a surface active dispersing agent, and the resulting aqueous suspension employed as sprays, drenches or washes. In other procedures, the products are employed as the toxic constituents in solvent solutions, oil-in-water and water-in-oil emulsions or aqueous dispersions. In representative operations, solvent compositions containing 1.5 percent by weight of N,N-diethyl 3-[di-(2-propynyl)-amino]-p-methoxybenzenesulfonamide give complete kills of lone star tick. In other representative operations, emergent aqueous compositions containing N,N-dimethyl 3-(2-propynylamino) p-toluenesulfonamide give substantially complete kills of two-spotted spider mites.

We claim:
1. A compound corresponding to the formula

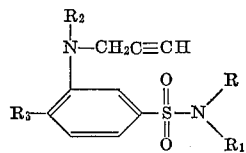

wherein R represents lower alkyl, $R_1$ represents a member of the group consisting of lower alkyl and 2-propynyl, $R_2$ represents a member of the group consisting of hydrogen and 2-propynyl and $R_3$ represents a member of the group consisting of hydrogen, methyl and methoxy.

2. N,N-dimethyl 3-(2-propynylamino) p-toluenesulfonamide.

3. N-butyl-N-(2-propynyl) 3-[di-(2-propynyl)-amino]-p-methoxybenzenesulfonamide.

4. N,N-diethyl 3-[di-(2-propynyl)amino]-p-methoxybenzenesulfonamide.

No references cited.

WALTER A. MODANCE, *Primary Examiner.*

HARRY I. MOATZ, *Assistant Examiner.*